United States Patent
Alkove et al.

(10) Patent No.: US 8,646,096 B2
(45) Date of Patent: Feb. 4, 2014

(54) SECURE TIME SOURCE OPERATIONS FOR DIGITAL RIGHTS MANAGEMENT

(75) Inventors: James M. Alkove, Woodinville, WA (US); Alexandre V. Grigorovitch, Redmond, WA (US); Patrik Schnell, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1369 days.

(21) Appl. No.: 11/823,594

(22) Filed: Jun. 28, 2007

(65) Prior Publication Data

US 2009/0006854 A1 Jan. 1, 2009

(51) Int. Cl.
*H04L 29/06* (2006.01)

(52) U.S. Cl.
USPC .................................. 726/27; 726/26; 726/30

(58) Field of Classification Search
USPC ................................. 726/27, 26, 30
See application file for complete search history.

(56) References Cited

U.S. PATENT DOCUMENTS

| | | | |
|---|---|---|---|
| 5,386,369 A | 1/1995 | Christiano | |
| 6,301,660 B1 | 10/2001 | Benson | |
| 6,772,340 B1 | 8/2004 | Peinado et al. | |
| 7,036,011 B2 | 4/2006 | Grimes et al. | |
| 7,103,574 B1 | 9/2006 | Peinado et al. | |
| 7,110,982 B2 | 9/2006 | Feldman | |
| 7,116,969 B2 * | 10/2006 | Park | 455/410 |
| 7,120,800 B2 | 10/2006 | Ginter et al. | |
| 7,152,165 B1 | 12/2006 | Maheshwari et al. | |
| 7,152,243 B2 | 12/2006 | Bourne et al. | |
| 7,174,457 B1 | 2/2007 | England et al. | |
| 7,178,041 B2 | 2/2007 | Asokan et al. | |
| 8,027,472 B2 | 9/2011 | Aissi et al. | |
| 2001/0032312 A1 | 10/2001 | Runje et al. | |
| 2002/0002674 A1 | 1/2002 | Grimes et al. | |
| 2002/0012432 A1 | 1/2002 | England et al. | |
| 2002/0073177 A1 | 6/2002 | Clark et al. | |
| 2002/0083318 A1 | 6/2002 | Larose | |
| 2002/0157002 A1 | 10/2002 | Messerges et al. | |
| 2003/0079122 A1 | 4/2003 | Asokan et al. | |
| 2004/0128499 A1 | 7/2004 | Peterka et al. | |
| 2004/0168061 A1 | 8/2004 | Kostal et al. | |
| 2004/0193546 A1 | 9/2004 | Tokutani et al. | |
| 2004/0225894 A1 | 11/2004 | Colvin | |
| 2005/0021948 A1 | 1/2005 | Kamperman | |

(Continued)

FOREIGN PATENT DOCUMENTS

| | | |
|---|---|---|
| WO | 2006031127 A2 | 3/2006 |
| WO | WO-2009006102 | 1/2009 |

OTHER PUBLICATIONS

"PCT Search Report and Written Opinion", Application No. PCT/US2008/068015, (Jan. 30, 2009), 11 pages.

(Continued)

*Primary Examiner* — Bradley Holder
(74) *Attorney, Agent, or Firm* — Wolfe-SBMC

(57) ABSTRACT

Various embodiments utilize hardware-enforced boundaries to provide various aspects of digital rights management or DRM in an open computing environment. Against the backdrop of these hardware-enforced boundaries, DRM provisioning techniques are employed to provision such things as keys and DRM software code in a secure and robust way. Further, at least some embodiments utilize secure time provisioning techniques to provision time to the computing environment, as well as techniques that provide for robustly secure storage.

12 Claims, 16 Drawing Sheets

(56) References Cited

U.S. PATENT DOCUMENTS

| | | | |
|---|---|---|---|
| 2005/0022019 A1 | 1/2005 | Medvinsky et al. | |
| 2005/0204405 A1 | 9/2005 | Wormington et al. | |
| 2005/0268346 A1 | 12/2005 | Lee et al. | |
| 2005/0278787 A1* | 12/2005 | Naslund et al. | 726/26 |
| 2006/0064488 A1 | 3/2006 | Ebert | |
| 2006/0064756 A1 | 3/2006 | Ebert | |
| 2006/0112275 A1 | 5/2006 | Jeal et al. | |
| 2006/0146057 A1* | 7/2006 | Blythe | 345/506 |
| 2006/0150254 A1* | 7/2006 | Siukonen | 726/27 |
| 2006/0174352 A1 | 8/2006 | Thibadeau | |
| 2006/0259790 A1 | 11/2006 | Asokan et al. | |
| 2006/0282391 A1 | 12/2006 | Peterka et al. | |
| 2006/0288238 A1 | 12/2006 | Ray et al. | |
| 2007/0006183 A1 | 1/2007 | Mensch et al. | |
| 2007/0022306 A1 | 1/2007 | Lindsley | |
| 2007/0027814 A1 | 2/2007 | Tuoriniemi | |
| 2007/0089174 A1 | 4/2007 | Bader et al. | |
| 2007/0094719 A1 | 4/2007 | Scarlata | |
| 2007/0100701 A1* | 5/2007 | Boccon-Gibod et al. | 705/21 |
| 2007/0100768 A1* | 5/2007 | Boccon-Gibod et al. | 705/59 |
| 2007/0104104 A1 | 5/2007 | Abu-Amara | |
| 2007/0104329 A1 | 5/2007 | England | |
| 2007/0118880 A1* | 5/2007 | Mauro | 726/4 |
| 2007/0185815 A1* | 8/2007 | Boccon-Gibod et al. | 705/51 |
| 2008/0168565 A1* | 7/2008 | Reinikainen et al. | 726/26 |
| 2008/0276298 A1* | 11/2008 | Leterrier et al. | 726/2 |
| 2008/0304364 A1* | 12/2008 | Holtzman et al. | 368/10 |
| 2008/0306710 A1* | 12/2008 | Holtzman et al. | 702/178 |
| 2008/0307237 A1* | 12/2008 | Holtzman et al. | 713/193 |
| 2008/0307494 A1* | 12/2008 | Holtzman et al. | 726/2 |
| 2008/0307495 A1* | 12/2008 | Holtzman et al. | 726/2 |
| 2008/0307507 A1* | 12/2008 | Conley et al. | 726/4 |
| 2008/0307508 A1* | 12/2008 | Conley et al. | 726/4 |
| 2009/0006854 A1 | 1/2009 | Alkove et al. | |
| 2009/0006862 A1 | 1/2009 | Alkove et al. | |
| 2009/0006868 A1 | 1/2009 | Alkove et al. | |
| 2010/0024000 A1* | 1/2010 | Holtzman et al. | 726/2 |

OTHER PUBLICATIONS

"The Next Generation of Secure Technology for Digital Media Devices", Date: 2007, pp. 1-3.

Al Hawtin, "Digital Rights Management in Silicon: The Balance between Content Owners and Consumers", http://www.embeddedtechjournal.com/articles_2007/20070206_drm.htm.

Health, et al., "Symbian OS Version 9 and Secure Hardware is the Foundation for Secure DRM", Date: Oct. 4, 2006, pp. 1-4.

Aura, et al., "Software license management with smart cards", 1-11.

Oppliger, et al., "Does Trusted Computing Remedy Computer Security Problems?", IEEE Security& Privacy, IEEE Computer Society,(2005),16-19.

Shapiro, et al., "How to Manage Persistent State in DRM Systems", 1-11.

Garfinkel, et al., "Terra: A Virtual Machine-Based Platform for Trusted Computing", ACM Press, New York, USA,(Oct. 19-22, 2003),193-206.

Reid, et al., "DRM, Trusted Computing and Operating System Architecture", Conferences in Research and Practice in Information Technology. Australasian Information Security Workshop 2005 (AISW2005), Newcastle, Australia.,(2005),1-10, vol. 44.

Anderson, Ross "Cryptography and Competition Policy—Issues with 'Trusted Computing'", 1-17.

Zheng, et al., "Secure DRM scheme for future mobile networks based on trusted mobile platform", International Conference on Wireless Communications, Networking and Moblie Computing, 2005.,(Sep. 23-26, 2005),1164-1167, vol. 2.

"Non-Final Office Action", U.S. Appl. No. 11/823,685, (Oct. 4, 2010),33 pages.

"Final Office Action", U.S. Appl. No. 11/823,685, (Nov. 18, 2010),41 pages.

"Non-Final Office Action", U.S. Appl. No. 11/823,572, (Dec. 9, 2010),23 pages.

"Final Office Action", U.S. Appl. No. 11/823,572, (May 2, 2011),25 pages.

"Non-Final Office Action", U.S. Appl. No. 11/823,572, (Oct. 13, 2011),26 pages.

"Non-Final Office Action", U.S. Appl. No. 11/823,685, (Aug. 23, 2011),39 pages.

"Non-Final Office Action", U.S. Appl. No. 11/823,572, (May 23, 2012),27 pages.

"Non-Final Office Action", U.S. Appl. No. 11/823,572, (Jun. 19, 2013),10 pages.

"Final Office Action", U.S. Appl. No. 11/823,572, (Dec. 21, 2012), 28 pages.

"Final Office Action", U.S. Appl. No. 11/823,685, (Jan. 10, 2012),42 pages.

"Notice of Allowance", U.S. Appl. No. 11/823,572, (Oct. 2, 2013), 5 pages.

"Notice of Allowance", U.S. Appl. No. 11/823,685, (Oct. 7, 2013), 21 pages.

* cited by examiner

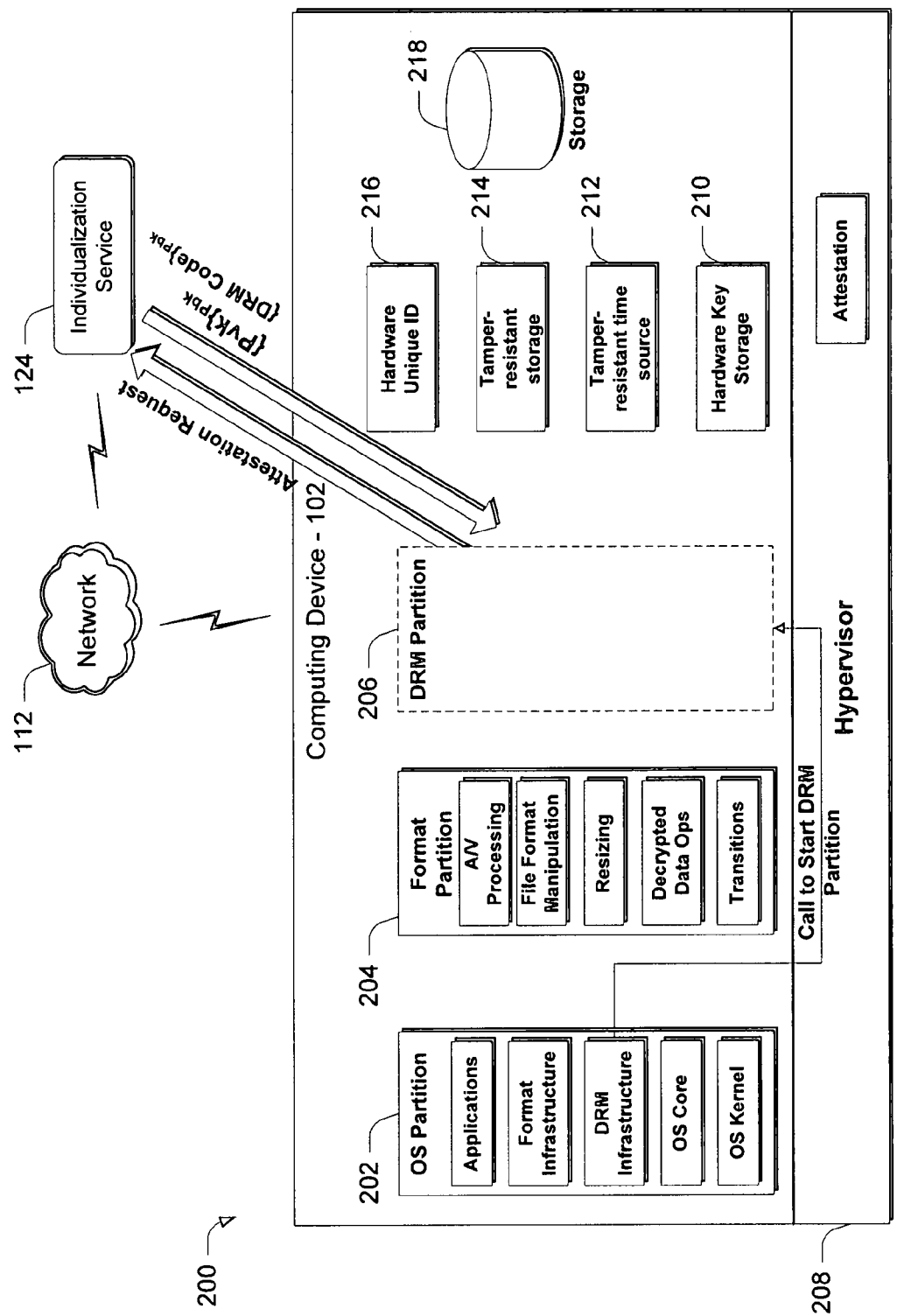

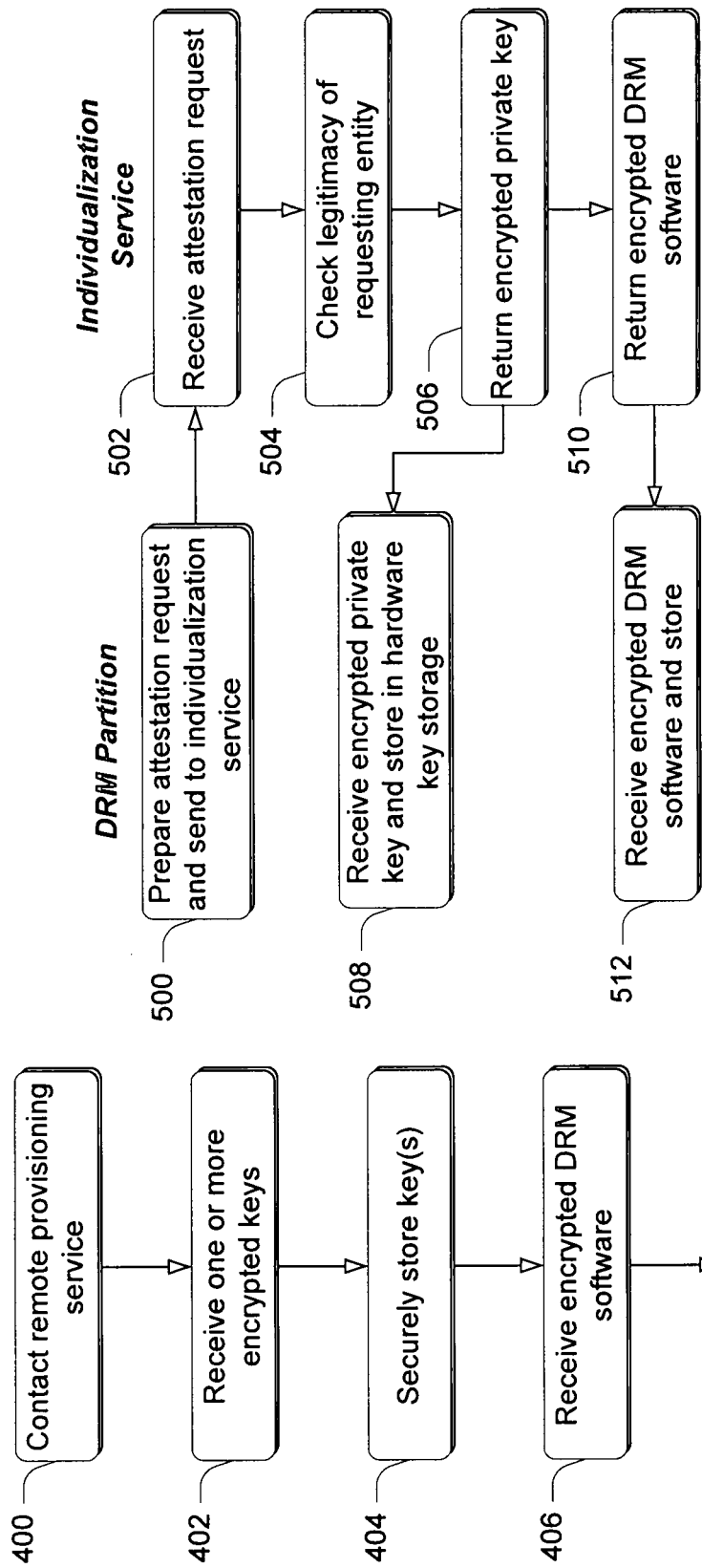

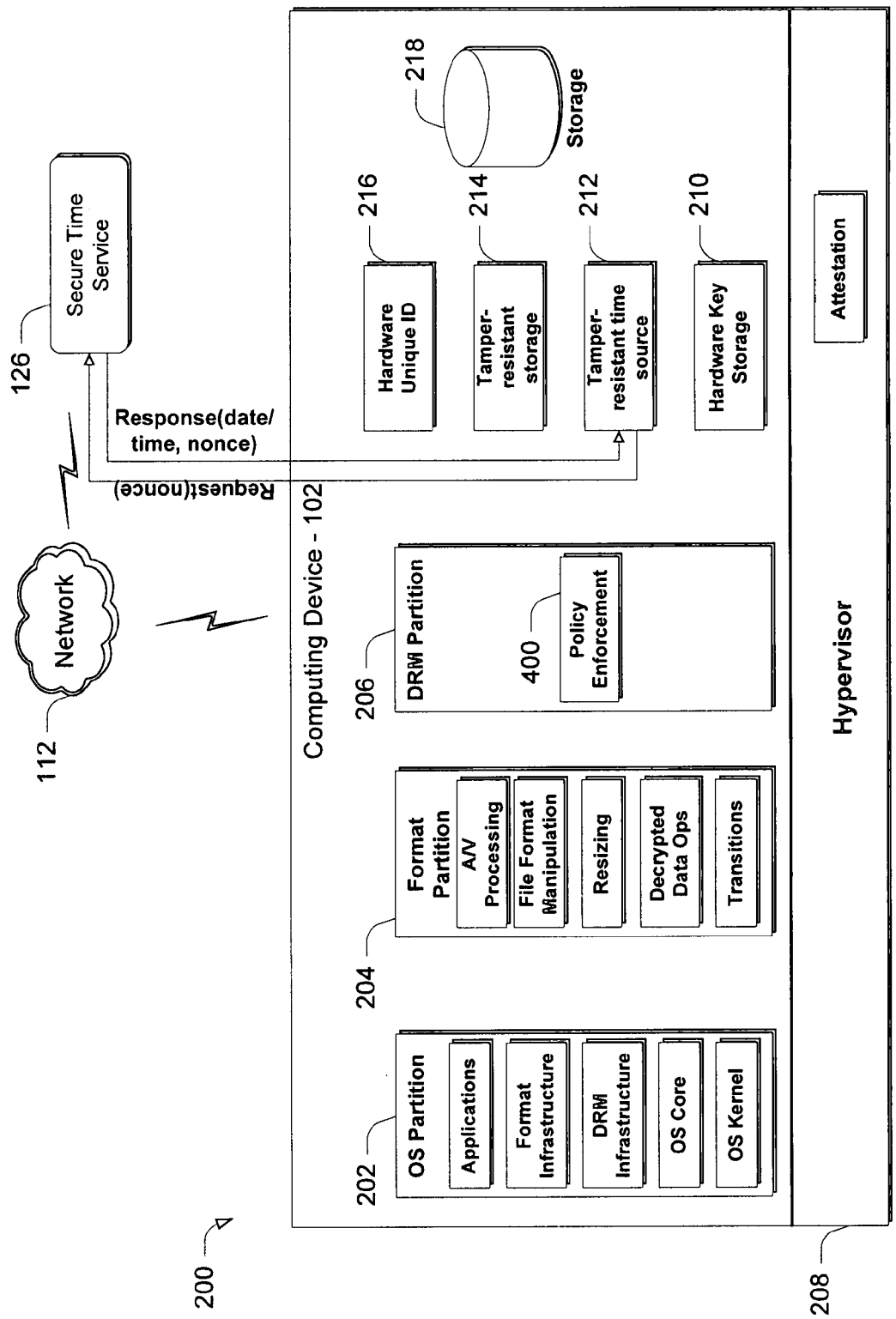

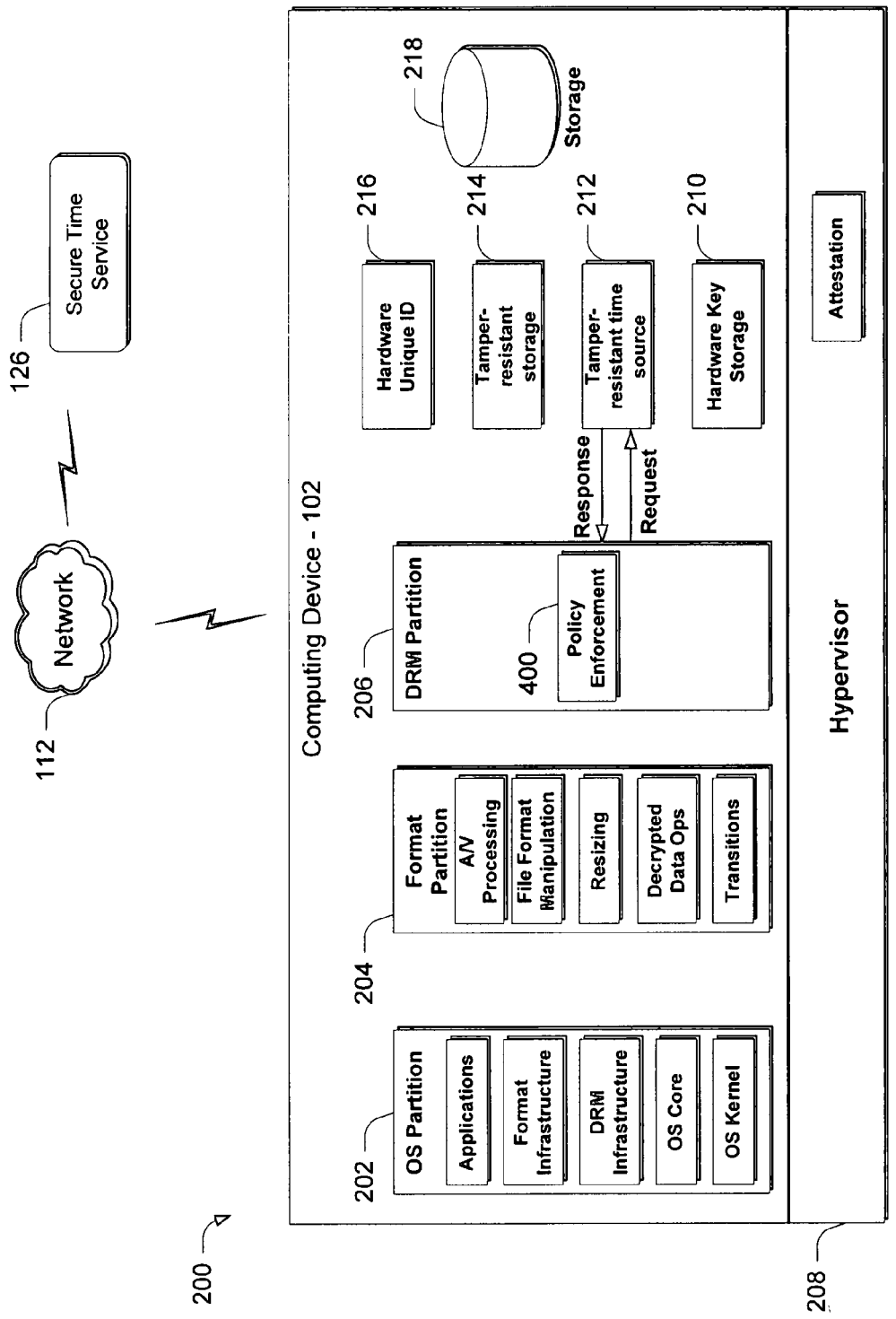

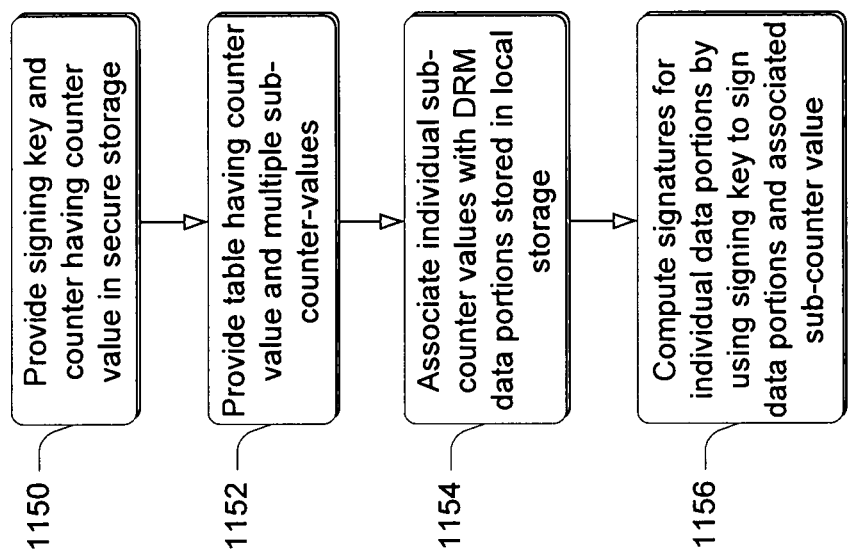

SECURE TIME SOURCE OPERATIONS FOR DIGITAL RIGHTS MANAGEMENT

BACKGROUND

Digital rights management or DRM refers to technologies that are used to control access to or usage of digital data or hardware that processes digital data. In a computing environment, such as a personal computing environment, DRM protection schemes are typically implemented by a DRM software layer that works in concert with a device's operating system and applications to implement a particular protection scheme. One of the challenges of implementing DRM in many computing environments flows from the open nature of these computing environments. Specifically, many computing devices are open in the sense that a user and others can freely add software and/or hardware to the device. This "openness" can, by its very nature, be susceptible to various threat models which are not present in systems that are considered closed—such as set top boxes or other sealed hardware devices.

Another of the challenges with implementing DRM in various computing environments, particularly open environments, flows from the nature of how protections are implemented. Specifically, in many systems, various DRM protection schemes rely on software enforced boundaries to protect content. That is, all of the executable software that can touch protected content (such as audio/visual content) has to operate within a defined boundary where trust is specified, and it has to perform in a prescribed and specified way. Yet, hostile threat models can be employed by nefarious individuals to try to modify the behavior inside the trust boundary to circumvent DRM protection. Specifically, software code can be injected at various levels within a system's software stack, e.g. at the operating system level, DRM infrastructure level and/or application level, to attempt to modify the behavior of the stack and thus try to change DRM properties.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments utilize hardware-enforced boundaries to provide various aspects of digital rights management or DRM in an open computing environment. Against the backdrop of these hardware-enforced boundaries, DRM provisioning techniques are employed to provision such things as keys and DRM software code in a secure and robust way. Further, at least some embodiments utilize secure time provisioning techniques to provision time to the computing environment, as well as techniques that provide for tamper-resistant storage.

BRIEF DESCRIPTION OF THE DRAWINGS

The same numbers are used throughout the drawings to reference like features.

FIG. 3 illustrates the FIG. 2 computing device in accordance with one or more embodiments.

FIG. 4 is a flow diagram that describes steps in a method in accordance with one or more embodiments.

FIG. 5 is a flow diagram that describes steps in a method in accordance with one or more embodiments.

FIG. 6 illustrates the FIG. 2 computing device in accordance with one or more embodiments.

FIG. 7 illustrates the FIG. 6 computing device in accordance with one or more embodiments.

FIG. 11A is a flow diagram that describes steps in a method in accordance with one or more embodiments.

DETAILED DESCRIPTION

Overview

Various embodiments utilize hardware-enforced boundaries to provide various aspects of digital rights management or DRM in an open computing environment. Against the backdrop of these hardware-enforced boundaries, DRM provisioning techniques are employed to provision such things as keys and DRM software code in a secure and robust way. Further, at least some embodiments utilize secure time provisioning techniques to provision time to the computing environment, as well as techniques that provide for tamper-resistant storage.

In the discussion that follows, a section entitled "Operating Environment" is provided and describes one example operating environment in which one or more embodiments can be employed. Following this, a section entitled "Implementation Example" describes an implementation example in which various inventive principles can be employed. Next, a section entitled "Provisioning DRM—Example" is provided and describes how DRM software can be provisioned in accordance with one or more embodiments. A section entitled "Secure Time Source Operations" follows and describes example embodiments in which secure time source operations can take place. Following this section, a section entitled "Secure Storage" describes how secure storage functionality can be provided in accordance with one or more embodiments. Finally, a section entitled "Example System" describes but one example computing system that can be utilized to implement various embodiments described in this document.

Operating Environment

Figure 1:
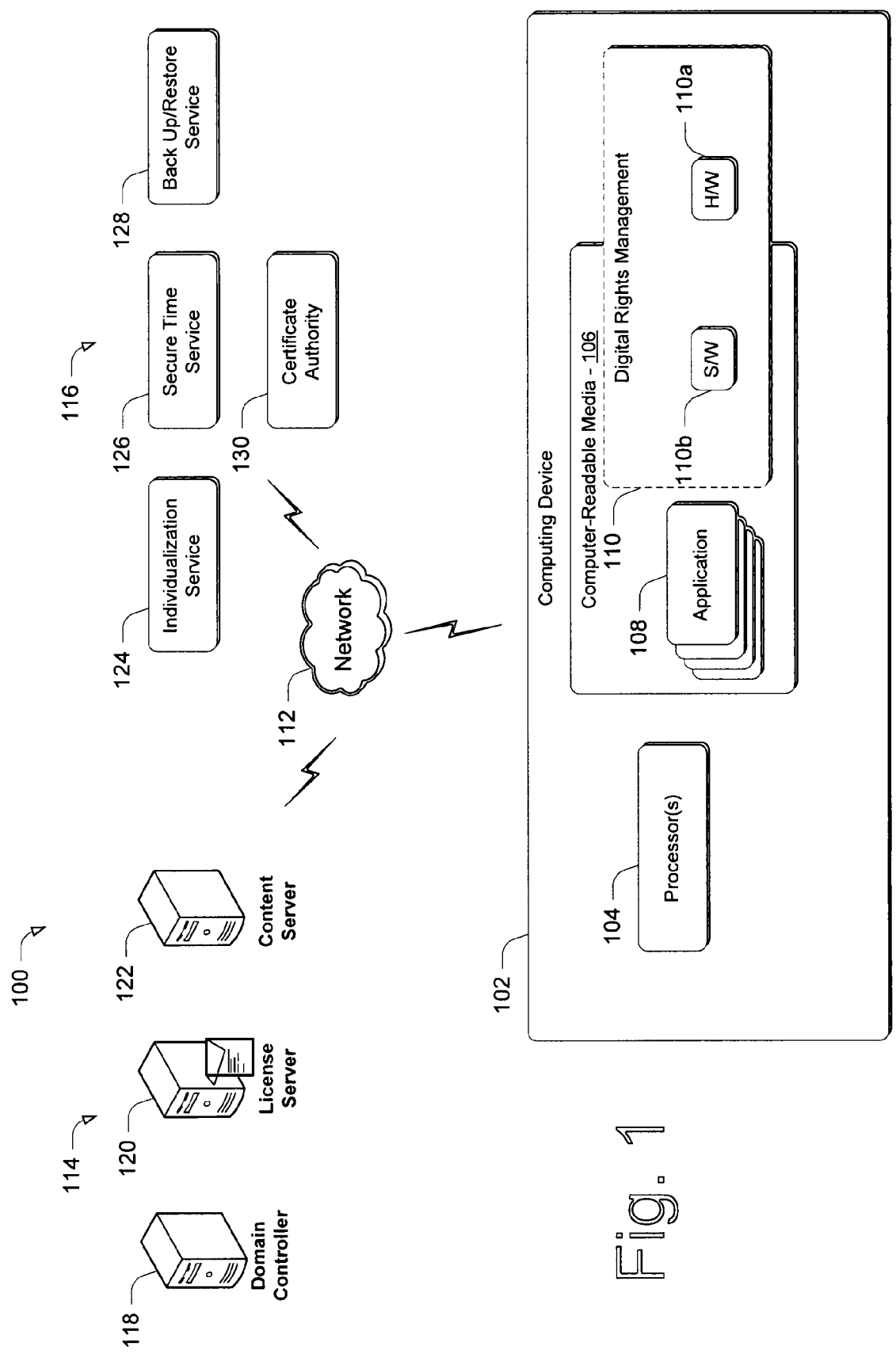
FIG. 1 illustrates an example operating environment in accordance with one or more embodiments.

FIG. 1 illustrates an operating environment in accordance with one or more embodiments, generally at 100. Environment 100 includes a computing device 102 having one or more processors 104, one or more computer-readable media 106 and one or more applications 108 that reside on the computer-readable media and which are executable by the processor(s). The applications can include those that are configured to process or otherwise consume content that is protected by digital rights management (DRM) techniques described in this document. Such applications can include, by way of example and not limitation, various media playing applications and the like.

The computer-readable media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 15.

In addition, computing device 102 includes a digital rights management platform 110 that is configured to implement digital rights management techniques, including the provisioning techniques described herein. In one or more embodiments, the platform includes both hardware and software components 110a, 110b respectively, as will become apparent below. In one or more embodiments, hardware aspects of the platform are secure and tamper-resistant. Any suitable type of secure hardware can be used to implement the embodiments described herein. Characteristics of secure hardware can include, by way of example and not limitation, having certain functionality, such as that described below, that executes in accordance with the specification of the hardware. And, while the secure hardware may, in itself contain software, software executing outside of the secure hardware cannot cause the functionality of the secure hardware, or the software executing in the secure hardware, to change in an undesirable way. Examples of commonly available secure hardware include, by way of example and not limitation, Trusted Platform Modules (TPMs), secure microcontrollers, and special-purpose application-specific integrated circuits (ASICs), to name just a few. TPMs can be embodied, as will be appreciated by the skilled artisan, as a module on a computing device's motherboard and can perform such functions as cryptographic functions, creating protecting and managing cryptographic keys, performing digital signature operations, and anchoring chains of trust for keys, digital certificates, and other credentials.

Computing device 102 can be embodied as any suitable computing device such as, by way of example and not limitation, a desktop computer, a portable computer, a handheld computer such as personal digital assistants (PDA), cell phone, and the like. In addition, the techniques described herein find particular utility in the context of computing devices that include software platforms that are open, in the sense that the platform is an open programmable platform and/or one that includes a distributed set of removable hardware components that can be physically distributed across a motherboard.

In addition, environment 100 includes a network 112, such as the Internet or some other suitable network that allows computing device 102 to communicate with a variety of entities that are involved in some way with one or more of distribution or protection of digital content. The example provided just below is intended to provide the reader with a basic overview of example entities and/or functionality that can exist within operating environment 100. The description is not intended to limit application of the claimed subject matter to one particular operating environment or type of operating environment.

Accordingly, in this particular example, such entities or functionality can include, by way of example and not limitation, various server entities such as those shown generally at 114, and various service entities, such as those shown generally at 116.

In this particular example, server entities include, by way of example and not limitation, a domain controller 118, a license server 120 and a content server 122.

Domain controller 118 is configured to create free movement of content among various authorized devices. It does this by setting up and managing a shared identity between these devices. With a shared identity, content can be licensed to that identity and hence distributed among the devices that share the identity.

License server 120 is configured to serve DRM licenses to various computing devices. The DRM licenses typically describe and define the terms of use of a particular piece of content.

Content server 122 is configured to serve content that is governed by one or more licenses that can be distributed by the license server 120.

In this particular example, service entities or functionality can include, by way of example and not limitation, an individualization service 124, a secure time service 126, a back up/restore service 128 and a certificate authority 130.

In one or more embodiments, individualization service 124 is a trusted service and is configured to perform a number of functions among which include provisioning and renewability.

With regard to provisioning, the individualization service is configured to provide a generally unique version of a trusted environment to each computing device or client. In the example below, this trusted environment is embodied, at least in part, by DRM software that is securely, remotely provisioned to the computing device. The DRM software is embodied, in the specific example, as a DRM partition that is isolated from other functional partitions on the computing device. It is to be appreciated and understood, however, that other types of DRM software can be used without departing from the spirit and scope of the claimed subject matter. From the provisioning standpoint, both keys and DRM software code are provisioned by the individualization service, as will become apparent below.

With regard to renewability, the individualization service is configured to, in the presence of a code compromise, fix or upgrade and cause a download of a fixed or newer version of code that has been compromised. Code can be compromised for any number of reasons. For example, license server 120 or content server 122 may indicate to the individualization service that a particular version of code that is being used on computing device 102 is no longer trusted. In this instance, the individualization service can see to it that new trusted code gets provisioned to the device as described below.

In one or more embodiments, secure time service 126 works in conjunction with various licensing models that determine how long particular content can be played. This service is configured to send out digitally signed time stamps that provide a secure and accurate representation of time to ensure that the proper time is used by digital rights management platform 110.

In one or more embodiments, back up/restore service 128 provides functionality that allows a user to migrate licenses from one device to another.

In one or more embodiments, certificate authority 130 includes two functions. First, a forward-looking enrollment service provides certificates for license servers such as license server 120. Second, a backend infrastructure creates certificates that are distributed to individual computing devices, such as device 102.

Having discussed an example operating environment, consider now an implementation example in which provisioning and other operations can take place. While the example just below utilizes the operating environment of FIG. 1, it is to be appreciated and understood that other operating environments, different from the one described above, can be utilized without departing from the spirit and scope of the claimed subject matter.

Implementation Example

Figure 2:
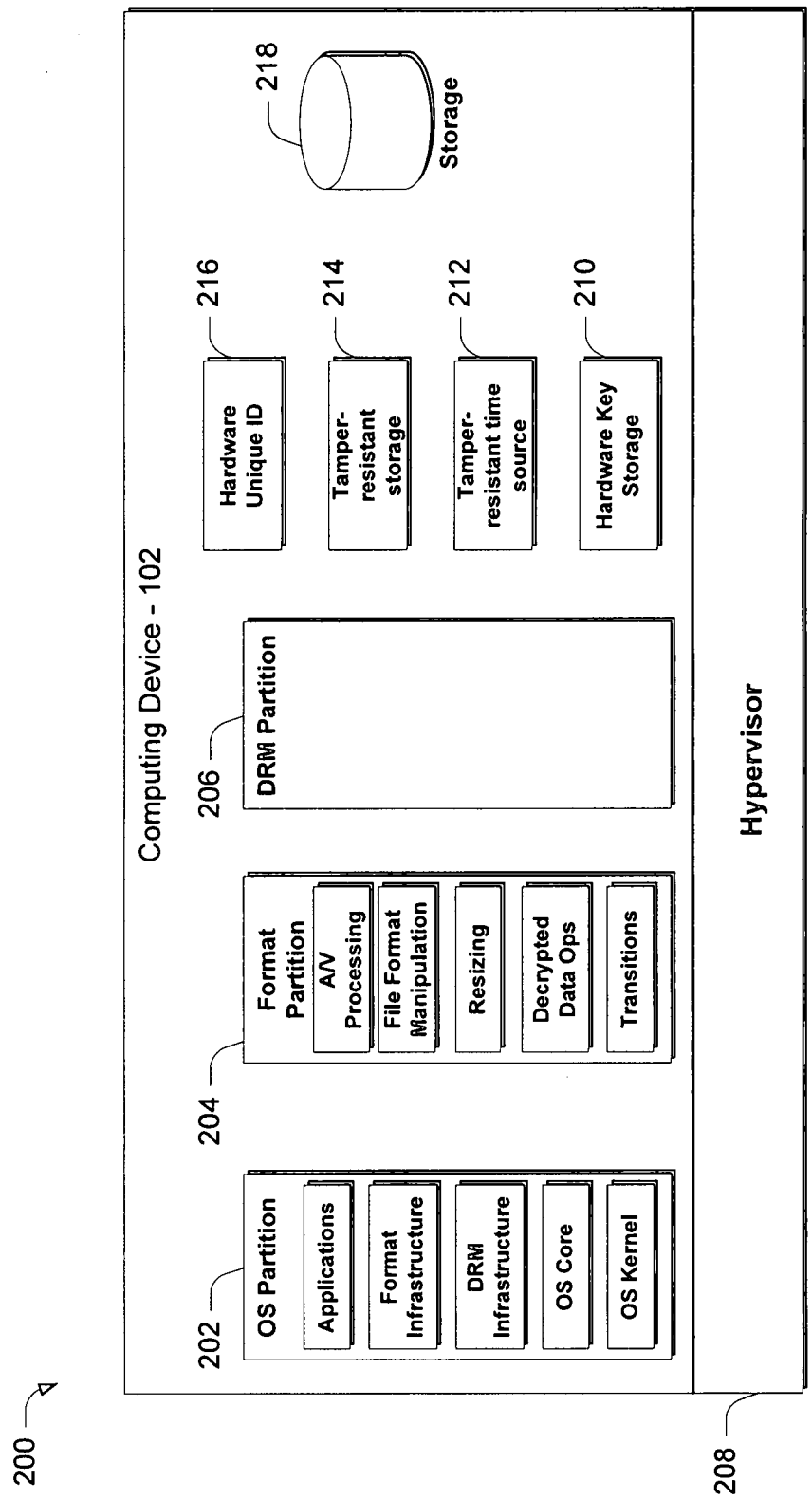
FIG. 2 illustrates an example computing device in accordance with one or more embodiments.

FIG. 2 illustrates a system in accordance with one embodiment generally at 200. System 200 includes the computing device 102 of FIG. 1. In the discussion that follows, certain of the components of the FIG. 1 computing device have not been repeated here for the sake of brevity. In addition, the discussion first proceeds with a general overview of the FIG. 2 system. Following this, a discussion of how DRM software is provisioned in accordance with one or more embodiments is provided.

In this particular example, system 200 comprises a plurality of partitions including an operating system partition 202, a format partition 204 and a DRM partition 206. Each of the partitions is implemented, in this example, in software and managed by a so-called hypervisor 208 discussed below in more detail. It is to be appreciated and understood, that the described hypervisor constitutes but one way of creating and enforcing the described partitions. Other techniques can, of course, be used. For example, the described partitions can be managed by secure hardware that comprises part of the system. In this example, DRM partition 206 corresponds to DRM software 110b in FIG. 1. In addition, in this example, system 200 includes hardware (corresponding to hardware 110a in FIG. 1) in the form of hardware key storage 210, tamper-resistant time source 212, tamper-resistant storage 214 and a hardware unique ID 216 which includes a unique ID that is associated with and uniquely identifies the computing device with which it is associated. Each of these hardware components is discussed below in more detail. In addition, system 200 includes local storage 218 which is utilized to implement tamper-resistant storage functionality as will become apparent below.

In one or more embodiments, hypervisor 208 provides virtualization technology and comprises a thin layer of software that resides between hardware, such as hardware 210-216 and software such as partitions 202, 204 and 206. The hypervisor allows multiple instances of the same or different operating systems to run, unmodified, on a host computer at the same time. The hypervisor provides for partitioning functionality, as indicated above, and is responsible for maintaining strong isolation between partitions. In at least some embodiments, the hypervisor architecture provides a very small attack surface, as it does not contain any third party device drivers.

In operation, hypervisor-based functionality enables a parent partition—here operating system partition 202—which is responsible for creating and managing one or more child partitions—here, format partition 204 and DRM partition 206. Specifically, the parent partition can, but need not, manage memory for child partitions and virtualize devices for child partitions. Each partition is a virtual machine and has one or more virtual processors, as will be appreciated by the skilled artisan. Partitions can own or share hardware resources.

In one or more embodiments, hypervisor 208 performs a number of functions including, by way of example and not limitation, enforcing memory access rules, enforcing policy for CPU usage, enforcing ownership of other devices, providing inter-partition messaging, and exposing a programmatic interface called hypercalls.

Within the operating system partition 202 is a virtualization stack that comprises a collection of components that run in the parent partition for virtual machine management. This collection of components includes, by way of example and not limitation, operating system kernel components which provide kernel mode functionality, operating system core components which provide user mode functionality, DRM infrastructure components which work with and communicate with DRM partition 206, format infrastructure components which work with and communicate with format partition 204, and one or more applications which can interact with or otherwise consume DRM-protected content to provide a user experience.

Within format partition 204 are components that provide functionality including, by way of example and not limitation, audio/visual processing including decoding, file format manipulations, resizing, decrypted data operations, transitions and the like. Typically, any type of formatting functionality or processing is performed by components that run inside the format partition.

Within DRM partition 206 resides the DRM software code that performs DRM operations. Any suitable DRM functionality can be performed by the DRM software code such as acquisition, management and enforcement of licenses that pertain to DRM-protected content. Preliminarily, however, when DRM partition 206 is created, it is essentially a shell that does not include the DRM software that it will eventually utilize to implement its functionality. This DRM software is provided to the DRM partition through a provisioning process that is described just below.

Provisioning DRM

Example

In one or more embodiments, prior to being provisioned, DRM partition 206 has not yet been created. Therefore, in at least some embodiments, the DRM partition is first created. In one or more embodiments, the DRM partition is created via a call from the DRM infrastructure in the operating system partition 202 as shown in FIG. 3, where like numerals from FIG. 1 are used to depict like components.

When the DRM partition is created, it executes as an empty host or operating environment that does not include the DRM functionality or software that it will eventually use to perform its function. As created, the DRM partition has an identity (ID) which, in this example, is essentially a hash of the binary code that was loaded to provide the host. Any suitable identity can be used. This identity, along with other information, becomes part of an attestation communication that takes place between DRM partition 206 and individualization service 124 to initiate the provisioning process.

Specifically, in one or more embodiments, in order to be provisioned with DRM software, DRM partition 206 generates an attestation request that includes the ID of the DRM partition, along with an identification of computing device 102, an identification of a version of the operating system running on the device and an identification of the hypervisor that is executing on the device. The attestation request is sent to and processed by the individualization service 124.

When the individualization service 124 receives the attestation request, it can use the information in the attestation request to make a trust decision as to whether it should provision DRM functionality to the requesting entity. Specifically, the individualization service 124 can confirm, using the information contained in the request, whether the request came from a legitimate, functional device and hypervisor. If, for some reason, the information in the attestation request does not confirm this legitimacy, then a decision can be made by the individualization service to not provide DRM content and software to the device.

If, however, the attestation request checks out as legitimate, then the individualization service can begin its provisioning process. Specifically, in one or more embodiments, the individualization service first provisions a private key to the DRM partition 206. In the past, keys such as this were physically embedded inside the software that provides DRM functionality. Here, however, an encrypted version of a private key (Pvk) is distributed by the individualization service. Specifically, a public key associated with hardware key storage 210 is used to encrypt a private key of a public/private key pair. This encrypted private key is sent to DRM partition 206 and stored in key storage 210. When the key is stored in hardware key storage 210, it is only accessible to DRM partition 206. That is, in one or more embodiments, hypervisor 208 gates access to the private key so that only the specifically identified version of the DRM partition that was used in the attestation can make use of the key. Accordingly, requests to the hypervisor from other entities will be refused. This effectively seals or isolates the key to the DRM partition 206. Accordingly, at this point, one or more keys have been securely provisioned to the DRM partition.

In one or more embodiments, now that a private key has been provisioned to the DRM partition 206, DRM software can now be provisioned. The DRM software can be any suitable software that can be used to implement DRM functionality. By way of example and not limitation, such functionality can include license management, decryption functionality, transfer of content between devices, output protection and the like.

In one or more embodiments, DRM software can be provisioned to DRM partition 206 in encrypted and signed form. Specifically, in one or more embodiments, the DRM software is encrypted with, for example, an intermediate symmetric key that is delivered by means of being encrypted by the public key of the DRM partition, and delivered to the DRM partition. Once delivered to the DRM partition, the encrypted DRM software can be stored in storage 218 until it is needed by the DRM partition. Specifically, when the DRM software is needed, the encrypted software can be loaded in the DRM partition and then decrypted using the DRM partition's private key. Recall that use of the DRM partition's private key is gated by the hypervisor 208. As such, only the correct version of DRM partition 206 can use the private key. Accordingly, in one or more embodiments, the DRM software will only decrypt and run in DRM partition 206. As will be appreciated by the skilled artisan, this can obviate the need to use obfuscation techniques to protect the DRM code.

Consider now that at this point in the process, a private key as well as DRM software has been provisioned to a particular arrangement of hardware executing on a particular identified computing device. In one or more embodiments, the key and software can be used by or will run inside of the uniquely identified DRM partition on a particular instance of device hardware. In this manner, a very robust system is provided that not only securely provisions DRM functionality, but enforces separation between the various partitions, e.g. between the format partition 204 and the DRM partition 206.

FIG. 4 is a flow diagram that describes steps in a method in accordance with one or more embodiments. The method can be implemented in connection with any suitable hardware, software, firmware or combination thereof. In at least some embodiments, the method can be implemented by a system, such as the one described above. It is to be appreciated and understood that other systems can be utilized without departing from the spirit and scope of the claimed subject matter.

Step 400 contacts a remote provisioning service. This step can be performed in any suitable way. For example, the remote provisioning service can be contacted via a suitably configured network, such as the Internet. Step 402 receives one or more encrypted keys from the provisioning service. The key(s) can be used for any suitable purpose. In at least some embodiments, the key(s) comprise a private key that is to be used in implementing a DRM process. Step 404 securely stores the key(s). In at least some embodiments, the key(s) can be stored in a tamper-resistant hardware store. Step 406 receives, from the provisioning service, encrypted DRM software and step 408 stores the encrypted DRM software. The DRM software can be encrypted using any suitable techniques examples of which are provided above.

FIG. 5 is a flow diagram that describes steps in a method in accordance with one or more embodiments. The method can be implemented in connection with any suitable hardware, software, firmware or combination thereof. In at least some embodiments, the method can be implemented by a system, such as the one described above. In this particular example, various methodical steps are listed under the heading "DRM Partition" and various other methodical steps are listed under the heading "Individualization Service". This is done to identify the entities that perform the various steps in accordance with one or more embodiments. It is to be appreciated and understood that other systems can be utilized without departing from the spirit and scope of the claimed subject matter.

Step 500 prepares an attestation request and sends the attestation request to an individualization service. Any suitable attestation request can be used and it can contain any suitable information or type of information. In one or more embodiments, the attestation request includes information that identifies the DRM partition, the computing device on which the DRM partition is executing and operating system associated with the computing device. Step 502 receives the attestation request and step 504 checks the legitimacy of the requesting entity. This step can be performed in any suitable way. For example, the individualization service may have a revocation list that describes DRM partitions or computing devices that have been compromised. If a particular DRM partition or system on which it is executing has been compromised, then the method can terminate. Assume, however, for the sake of the ongoing discussion, that there have been no compromises. In this case, step 506 can return an encrypted private key to the DRM partition.

Step 508 receives the encrypted private key and stores the private key in hardware key storage. In one or more embodiments, the hardware key storage is tamper-resistant such that unauthorized entities are not able to gain access to the content that resides in the storage. But one way of implementing tamper-resistant storage is to have an entity gate access to the contents of the storage. One way of gating access to the storage is through the use of a hypervisor, an example of which is described above. It is to be appreciated and understood, however, that other systems can be utilized without departing from the spirit and scope of the claimed subject matter.

Step 510 returns encrypted DRM software to the DRM partition. Step 512 receives the encrypted DRM software and stores the software. These steps can be implemented in any suitable way examples of which are provided above. In addition, the encrypted DRM software can be stored in any suitable fashion. For example, in one or more embodiments, the DRM software is stored, in encrypted form, in local storage on the local device on which the DRM partition executes. Then, when the DRM partition wishes to use the DRM software, it can be loaded in the DRM partition and decrypted for use. After use, the DRM software can be re-encrypted and stored in the local storage until such a time when it is needed again.

The above-described system can robustly and securely provision a computing system with DRM functionality in an open computing environment in a manner in which the attack surface of the DRM functionality is greatly reduced. In addition, various embodiments utilize hardware enforced boundaries that remove, to a large extent, software vulnerabilities that previously existed in other systems.

Having now discussed how an example system can be provisioned in accordance with one or more embodiments, consider now how such a system can be utilized to provide for secure time source operations.

Secure Time Source Operations

In computing systems that are considered as "open" in the sense that the systems are programmable and reconfigurable by users, it can be very desirable to have and utilize time values that are secure and remain that way. Specifically, many DRM systems utilize a time source to enable time-based decisions to be made with regard to DRM-protected content that is consumed on a particular device. For example, some DRM licenses may specify that a piece of content may only be consumed for a set period of time, or a subscription model may specify that a particular license for subscribed content expires after a set period of time. Whatever the case may be, it is desirable to have a time source that provides a generally protected and secure measure of time. Various advertising models can also utilize accurate time measurements in the administration of a particular advertising scheme, as will be appreciated by the skilled artisan.

In one or more embodiments, a remote secure time service serves as a source for secure time values. A communication protocol between the secure time service and a hardware-implemented, tamper resistant time source on board a computing device enables the time service to provide the secure time values—typically in the form of a date/time stamp—to the time source. The time source uses the date/time stamp and typically includes an oscillator that securely measures time and serves as a source of time values for a policy enforcement module that makes DRM time-based decisions. In one or more embodiments, the time source can have one or more attributes which include, by way of example and not limitation, having a valid and an invalid state, being settable from a trusted time service, providing a real time clock that includes the date and time, and/or being battery backed in the event of a power failure.

FIG. 6 illustrates an example system in accordance with one or more embodiments. Like numerals from the FIG. 2 embodiment are utilized to depict like components. In this example, a policy enforcement module 400 comprises part of the DRM software that was previously provisioned as described above. In this particular example, the policy enforcement module resides inside the DRM partition 206. It is to be appreciated and understood that the partitioning scheme described above and below constitutes but one way of implementing the described techniques. As such, other systems can be utilized without departing from the spirit and scope of the claimed subject matter.

In the FIG. 6 system, assume that time source 212 has not been initially provisioned with a secure time value from secure time service 126. To receive a first or initial time value, time source 212 generates a request that it, or a component within device 102, sends to the secure time service. In one or more embodiments, the request includes a value that can be used by the time source to verify that the response it receives is from the entity to which it sent the request. One example of such a value is a nonce or a "number used once". Accordingly, the time source's request is sent to the secure time service 126. The secure time service receives the request and builds an authenticable package that includes a time value in the form of a date/time stamp and the nonce. Any suitable authentication scheme can be used to build the package. For example, in some embodiments, the secure time service can use a message authentication code or MAC to provide an authenticable package. In this case, time resistant source 212 (or a component acting on its behalf) and secure time service 126 have negotiated a secret session key. The secret session key and, in this case, the package containing the date/time stamp and the nonce, are input into a MAC algorithm that produces a MAC. The package and the MAC are then sent to the time source 212 which can then use the same MAC algorithm, secret session key and package to both authenticate that the package came from the secure time source and to verify the integrity of the package's data.

In yet other embodiments, the secure time service can digitally sign the package to provide an authenticable package. In this case, the secure time service 126 has a private key and time source 212 has an associated public key. When secure time service 126 builds the package that contains the date/time stamp and the nonce, it can calculate a hash of the package using a hash algorithm, and then encrypt the hash with its private key thus creating a digital signature. The secure time service can then send the package along with the signature to the time source 212. When the time source receives the signed package, it can calculate a hash of the package using the same hash algorithm, decrypt the signature of the secure time service using the time service's associated public key, and verify that the hashes match.

At this point, time source 212 has received and stored a secure time value and can use this time value to provide DRM partition 206 with an accurate measure of time whenever the DRM partition requests it.

In one or more embodiments, time values can be delivered to the DRM partition 206 and its associated policy enforcement module 400 in substantially the same way as the initial time value was delivered from the time service 126 to the time source 212. Specifically, as shown in FIG. 7, a request from the DRM module 206 is sent to the time source 212 to request a time value. The request can, like the request above, include a nonce. The time source receives the request and responds with a response that includes a date/time stamp and the nonce. The response can be digitally signed using a private key associated with time source 212. Alternately, the time source can use a MAC as in the above example.

Once the DRM partition receives the response with the date/time stamp, it can then provide the date/time stamp to the policy enforcement module 400 so that the policy enforcement module can use it for making its time-based decisions.

Figure 8:
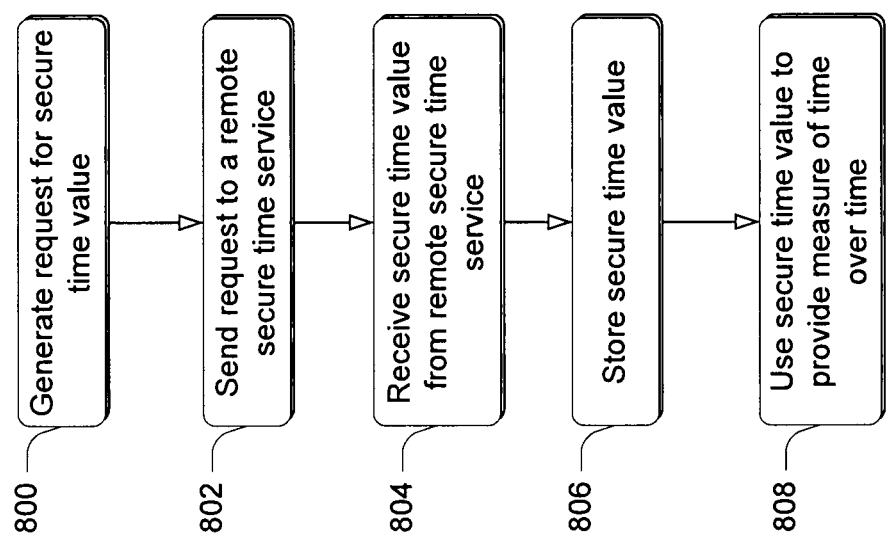
FIG. 8 is a flow diagram that describes steps in a method in accordance with one or more embodiments.

FIG. 8 is a flow diagram that describes steps in a secure time provisioning method in accordance with one or more embodiments. The method can be implemented in connection with any suitable hardware, software, firmware or combination thereof. In at least some embodiments, the method can be implemented by a system, such as the one described above. It is to be appreciated and understood that other systems can be utilized without departing from the spirit and scope of the claimed subject matter.

Step 800 generates a request for a secure time value. This step can be performed in any suitable way and by any suitable entity. In the above-example, the request is generated by a tamper-resistant time source that is located on a computing device, such as computing device 102. In the above example, the request includes a nonce as a means to verify that the response that is received was sent by the entity to which the request was sent. Step 802 sends the requests to a remote secure time service. Step 804 receives a secure time value from the remote secure time service. In one or more embodiments, this step can be performed by receiving an authenticable package that can be authenticated using any suitable techniques, examples of which are provided above.

Step 806 stores the secure time value. This step can be performed by storing the time value in a hardware-implemented, tamper-resistant time source, such as the one shown and described above. Step 808 uses the secure time value to provide a measure of time over time. This step can be performed by using the initially received time value as a seed to provide a time measure over time.

Figure 9:
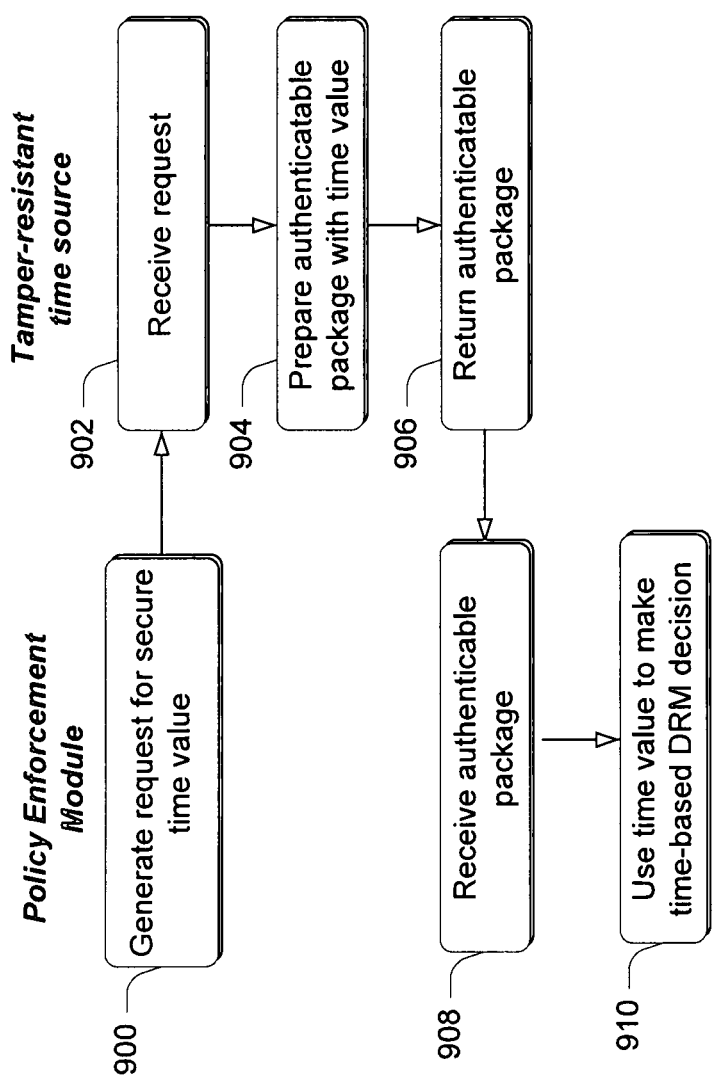
FIG. 9 is a flow diagram that describes steps in a method in accordance with one or more embodiments.

FIG. 9 is a flow diagram that describes steps in a method in accordance with one or more embodiments. The method can be implemented in connection with any suitable hardware, software, firmware or combination thereof. In at least some embodiments, the method can be implemented by a system, such as the one described above. In this particular example, various methodical steps are listed under the heading "Policy Enforcement Module" and various other methodical steps are listed under the heading "Tamper-resistant time source". This is done to identify the entities that perform the various steps in accordance with one or more embodiments. It is to be appreciated and understood that other systems can be utilized without departing from the spirit and scope of the claimed subject matter.

Step 900 generates a request for a secure time value. Examples of how this can be done are provided above. This step can be performed, for example, when the policy enforcement module wishes to make a time-based DRM decision. Step 902 receives the request and step 904 prepares an authenticable package with a time value. Examples of how this can be done are provided above. Step 906 returns the authenticable package to the policy enforcement module.

Step 908 receives the authenticable package and step 910 uses the time value to make a time-based DRM decision. Examples of how this can be done are provided above.

In addition to provisioning secure time values to and throughout computing device 102, one or more other embodiments can also provide cross checks periodically to ensure that the secure time values are not drifting over time. Cross checks can be performed in any suitable way. For example, cross checks can be conducted using a CPU clock, a system clock or some other internal clock such as an audio rendering clock. Alternately or additionally, the secure time values that are stored in time source 212 can be reset periodically over time to mitigate time drift concerns. Alternately or additionally, the system can, if on line, do periodic checks with the secure time service to ensure that the secure time values stored in time source 212 are not drifting.

Further, in at least some embodiments so-called grace periods can be provided to enable a user to enjoy their DRM-protected content even though there may have been a system malfunction. For example, if the time source is battery-backed and for some reason the battery gets removed, other system components can keep track of the elapsed time so that if the elapsed time is less than a certain pre-determined threshold, the user can continue to consume their content.

Having discussed secure time source operations, consider now a discussion of how secure storage can be implemented in one or more embodiments.

Secure Storage

In an open computing system, secure storage can be used to store a number of different items including, by way of example and not limitation, various information such as state information associated with license usage (e.g. first time played, last time played, and the like), revocation information pertaining to components that have been revoked or are in some way compromised, various keys including private keys, and the like. One of the protections that secure storage can provide is protection against a so-called replay attack. In a replay attack, the state of a device or component is rolled back so that restrictions or limitations in a license can be circumvented. For example, if a piece of content has a license that specifies that it can be consumed for 24 hours after the first time it is played, then a replay attack might attempt to roll back a system clock to trick the device into believing that 24 hours has not passed.

In the embodiments described below, secure storage functionality is implemented by utilizing a specific instance of secure, tamper-resistant hardware storage, as well as local storage on the computing device. A signing key and a counter are securely located in the hardware storage and are not accessible to unauthorized system software. In at least some embodiments, use of the signing key is brokered so that software other than DRM software cannot use the signing key. Brokering can take place using any suitable mechanism such as, by way of example and not limitation, hypervisor 208 (FIG. 2).

The signing key and counter are used to protect data, such as state information associated with DRM-protected content. Specifically, in one or more embodiments, counter values are monotonically incremented (or decremented) whenever a write operation is performed on data that is to be protected. The counter values are then stored in two locations—in the tamper-resistant storage and with the data that is written in the local storage. The counter values stored in the tamper-resistant storage serve to validate that the data has not been tampered with. Specifically, when data is read out of the local storage, its associated counter value in local storage can be checked with the counter value stored in the tamper-resistant storage to ascertain whether the values match. If the values match, then the data is valid and verified, and whatever DRM operation that is desired can take place. If the values do not match, then the data is not valid and cannot be verified.

In the discussion that follows, various ways of securely storing data in a verifiable way are first described under the heading "Securely Storing Data". Following this, a section entitled "Securely Reading the Counter" describes different ways in which counter values can be securely used to verify the validity of stored data.

Securely Storing Data

Figure 10:
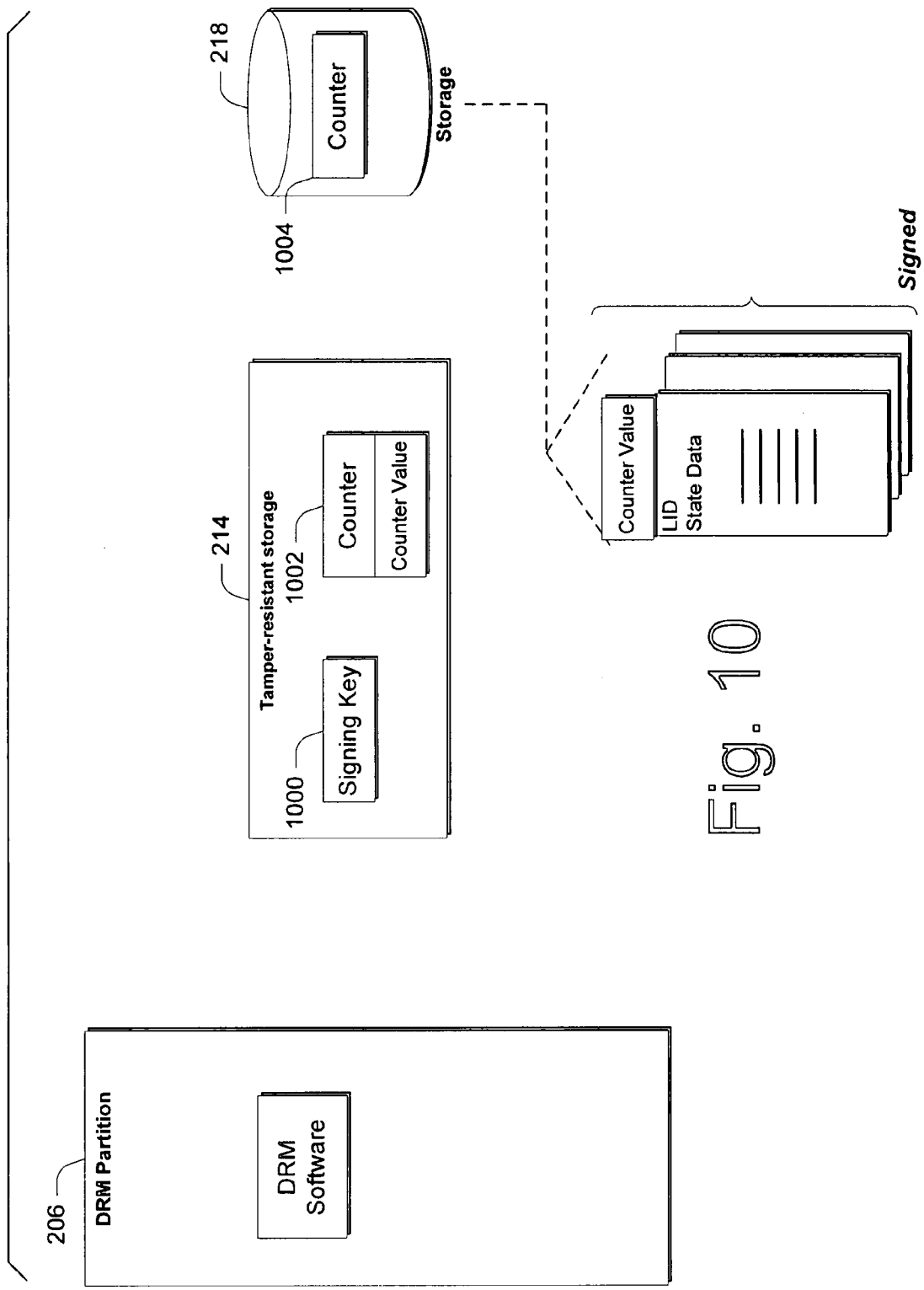
FIG. 10 illustrates aspects of a system in accordance with one or more embodiments.

FIG. 10 illustrates aspects of the previously-described system and includes, in this example, DRM software executing inside DRM partition 206, tamper-resistant storage 214 and local storage 218. In this example, storage 214 includes a signing key 1000 and a counter 1002 that stores counter values. Store 218 includes a counter 1004 that stores counter values. The counter values that are maintained by counters 1002 and 1004 are used to ensure that the data with which the counter is associated is valid and verifiable, as will become apparent below.

In the discussion that follows, three different examples are provided of how one can implement secure storage functionality. The first example stores data in local storage 218 and uses the signing key to sign both the counter value associated with counter 1004 and the data that is stored in the local storage. The last two examples utilize an efficiency that avoids having to sign all of the data in the local storage at one time. Rather, the last two examples utilize tables to reduce the amount of data that is signed, as will become apparent below.

Example 1

In various embodiments, the signing key 1000 can be a symmetric key such as one that is used to generate a MAC, or a private key such as one that comprises part of a public/private key pair.

Storage 218, which can typically be implemented by the computing device's hard drive, is used to store data that is desired to be protected. In this example, storage 218 stores license data which is typically identified by a license ID or LID associated with DRM-protected content, and various state data associated with the license. Each time a write operation is performed by, for example, DRM partition 206, the counter 1004 is incremented to its next counter value, and the combination of the next counter value and the data (including the newly written data) are signed using the signing key 1000 and stored in storage 218. The DRM partition then causes the storage 214 to increment its associated counter value so that the counter values match.

In an event the signing key is symmetric, a MAC algorithm can be used to compute a MAC of the key and the data in the data storage 218, including the new counter value. In an event the signing key is a private key, the private key is used to sign the data in the storage 218, including the new counter value.

Now, when the DRM partition wishes to read data from the storage 218, it reads the data out of the store and uses either an associated symmetric key or a public key associated with a private key that was used to sign the data to validate the data. Specifically, the DRM partition checks whether the counter value associated with counter 1004 matches the counter value associated with counter 1002. If the values match, then the data is valid and DRM operations can be performed. If the counter values do not match, then the data stored in the local storage 218 is not valid and DRM operations are not performed.

Figure 10A:
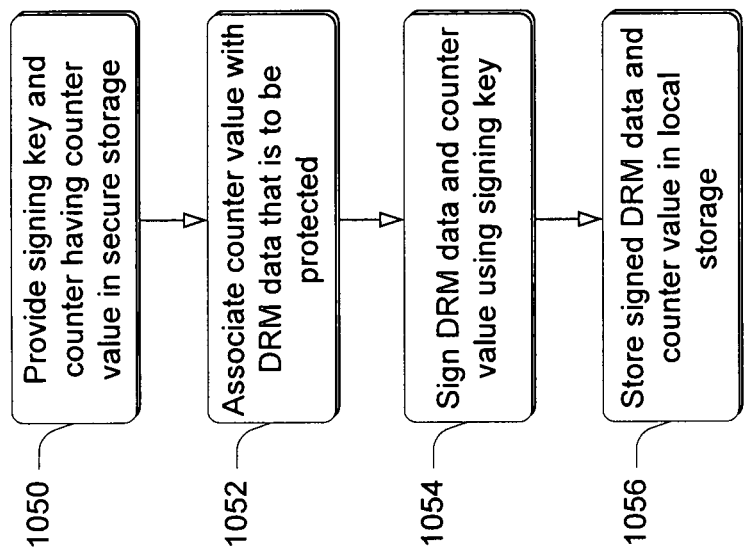
FIG. 10A is a flow diagram that describes steps in a method in accordance with one or more embodiments.

FIG. 10A is a flow diagram that describes steps in a method in accordance with one or more embodiments. The method can be implemented in connection with any suitable hardware, software, firmware or combination thereof. In at least some embodiments, the method can be implemented by a system, such as the one described above. It is to be appreciated and understood that other systems can be utilized without departing from the spirit and scope of the claimed subject matter.

Step 1050 provides a signing key and a counter having counter values in secure storage. This step can be performed in any suitable way. For example, the hardware design of the secure storage can include a suitable counter. Additionally, the signing key can be provided into secure storage at manufacture time or it can be separately provisioned in a manner such as that described above. Step 1052 associates a counter value with DRM data that is to be protected. An example of how this can be done is provided above. Step 1054 signs the DRM data and the counter value using the signing key. This step can be performed in any suitable way. For example, DRM software such as DRM partition 206 (FIG. 10) can use the signing key or cause the signing key to be used to sign the DRM data and counter value. Step 1056 stores the signed DRM data and counter value in local storage.

Using the techniques described above, secure storage functionality can be provided using local storage such as that which is provided by a computing device's hard drive.

Example 2

Figure 11:
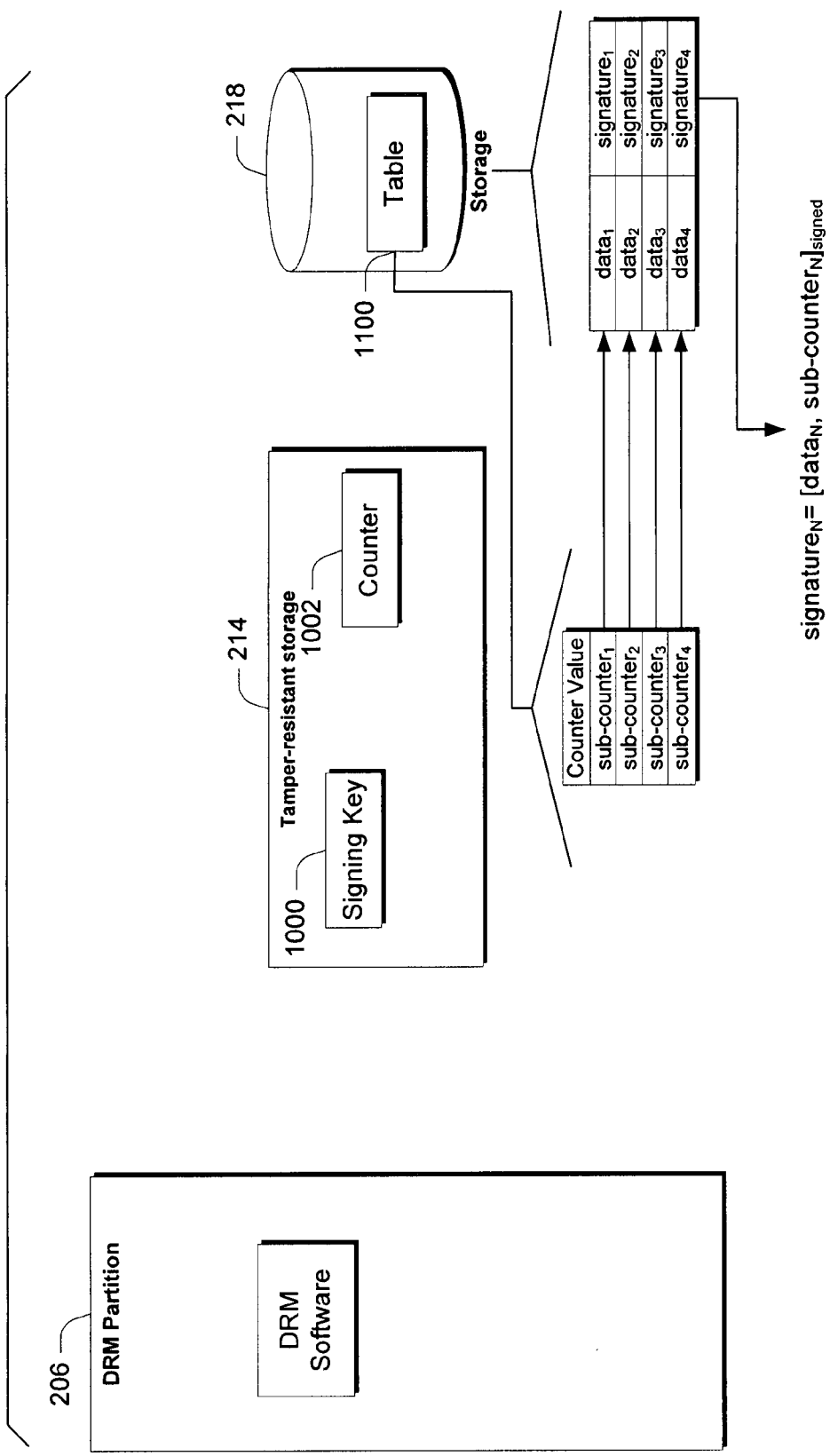
FIG. 11 illustrates aspects of a system in accordance with one or more embodiments.

FIG. 11 illustrates one embodiment in which a table is used to protect data that is stored in local storage 218. By using a table as described below, economies are gained because much less data is signed at any one time, as will become apparent below.

Specifically, in this example, local storage 218 includes a table 1100 which includes or otherwise holds a counter value and multiple sub-counter values. The counter value is associated with a value that is maintained by counter 1002 and is incremented each time the table is written to. In this sense, table 1100 serves as a master counter. Each of the sub-counter values is associated with a portion of DRM data that is stored in local storage 218. So, for example, sub-counter, is associated with data, which may hold a value associated with the first time a particular piece of content was played. Each time a particular piece of data—here $data_1$—is written to, its associated sub-counter—here $sub\text{-}counter_1$—is incremented along with the counter value associated with counter 1002 and then the table is signed using the signing key. In addition, each portion of data in local storage 218 has an associated signature which is computed, using the signing key 1000, as a function of the data portion and the associated sub-counter. This is represented in the figure as the following:

$$signature_N = [data_N, subcounter_N]_{signed}$$

Now, if the data portion in the local storage 218 is manipulated in any way, a subsequently computed signature will not match with the signature originally computed and stored in the local storage 218. So, for example, if the DRM software reads out a particular data portion and its associated signature, when it computes an associated signature using the sub-counter value stored in the table 1100 and the now-manipulated data, the computed signature will not match with the signature read in from the local storage 218. This being the case, the DRM software can take any appropriate actions such as disallowing a particular operation.

FIG. 11A is a flow diagram that describes steps in a method in accordance with one or more embodiments. The method can be implemented in connection with any suitable hardware, software, firmware or combination thereof. In at least some embodiments, the method can be implemented by a system, such as the one described above. It is to be appreciated and understood that other systems can be utilized without departing from the spirit and scope of the claimed subject matter.

Step 1150 provides a signing key and a counter having counter values in secure storage. This step can be performed in any suitable way examples of which are provided above. Step 1152 provides a table having a counter value and multiple sub-counter values. An example of how this can be done is provided above. Step 1154 associates individual sub-counter values with DRM data portions stored in local storage. Step 1156 computes signatures for the individual data portions by using the signing key to sign the data portions and their associated sub-counter values. The signature is then associated with the data portion which is stored in local storage.

Using the techniques described above, secure storage functionality can be provided using local storage such as that which is provided by a computing device's hard drive.

Example 3

Figure 12:
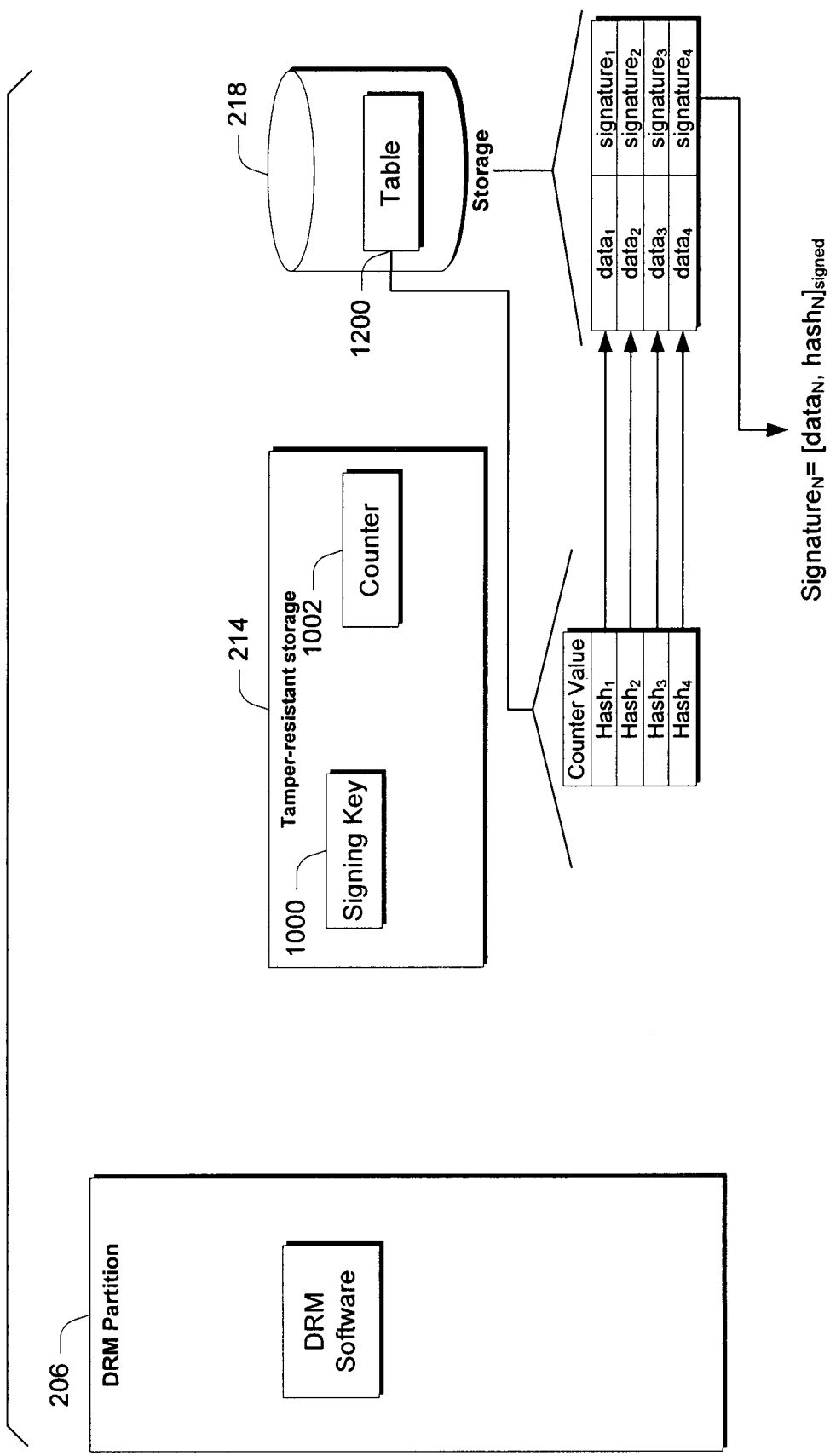
FIG. 12 illustrates aspects of a system in accordance with one or more embodiments.

FIG. 12 illustrates one embodiment in which a table is used to protect data that is stored in local storage 218. Specifically, in this example, local storage 218 includes a table 1200 that includes or otherwise holds a counter value and multiple hash values. The counter value serves as a master counter value and is incremented any time the table is written to. Each of the hash values is associated with a portion of data that is stored in local storage 218. So, for example, $hash_1$ may be associated with $data_1$ which holds a value associated with the first time a particular piece of content was played. Each time a particular piece of data—here $data_1$—is written to, an associated hash—here $hash_1$—is recomputed and the counter value associated with counter 1002 is incremented and the table is signed using the signing key. In addition, each portion of data in local storage 218 has an associated signature which is computed, using the signing key 1000, as a function of the data portion and the associated hash value. This is represented in the figure as the following:

$$signature_N=[data_N, subcounter_N]_{signed}$$

Now, if the data portion is manipulated in some way, a subsequently computed signature will not match with the signature originally computed and stored in the local storage 218 because the hashes of the data will be different.

Figure 12A:
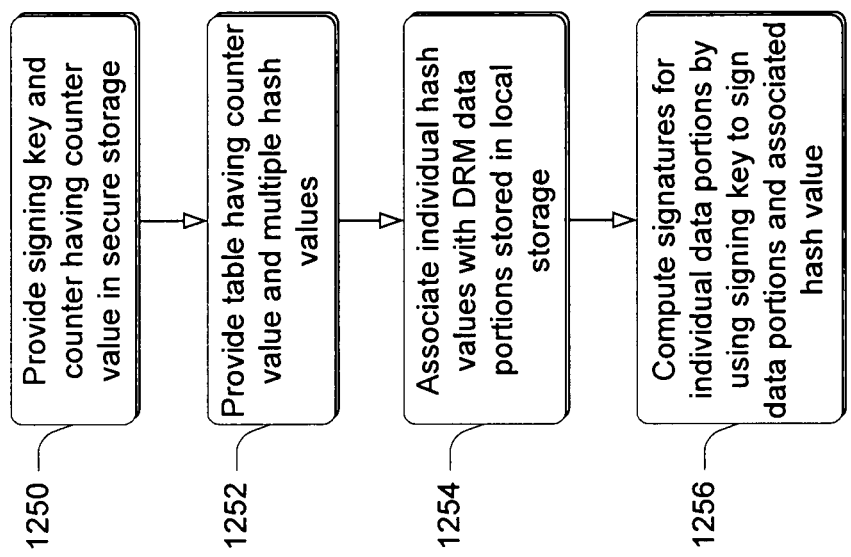
FIG. 12A is a flow diagram that describes steps in a method in accordance with one or more embodiments.

FIG. 12A is a flow diagram that describes steps in a method in accordance with one or more embodiments. The method can be implemented in connection with any suitable hardware, software, firmware or combination thereof. In at least some embodiments, the method can be implemented by a system, such as the one described above. It is to be appreciated and understood that other systems can be utilized without departing from the spirit and scope of the claimed subject matter.

Step 1250 provides a signing key and a counter having counter values in secure storage. This step can be performed in any suitable way examples of which are provided above. Step 1252 provides a table having a counter value and multiple hash values. An example of how this can be done is provided above. Step 1254 associates individual hash values with DRM data portions stored in local storage. Step 1256 computes signatures for the individual data portions by using the signing key to sign the data portions and their associated hash values. The signature is then associated with the data portion which is stored in local storage.

Using the techniques described above, secure storage functionality can be provided using local storage such as that which is provided by a computing device's hard drive.

Securely Reading the Counter

In the embodiments described above, the counter value that is maintained in storage 214 is used to validate that the data stored across the system has not been tampered with. When DRM software, such as the DRM partition, wishes to perform an operation on data that has been securely stored in the system, there are different options for performing the counter value verification examples of which are provided below. In at least some instances, the DRM partition itself can perform the counter value verification. In yet other instances, the tamper-resistant storage 214 can perform the counter value verification.

Consider instances in which the DRM software performs counter value verification. In this case, the DRM partition can send a nonce to the tamper-resistant storage 214. The tamper-resistant storage can then return, to the DRM partition, a signed package that includes the nonce and the counter value. The DRM partition can then verify the counter value associated with stored data with the counter value received from the tamper-resistant storage 214.

Figure 13:
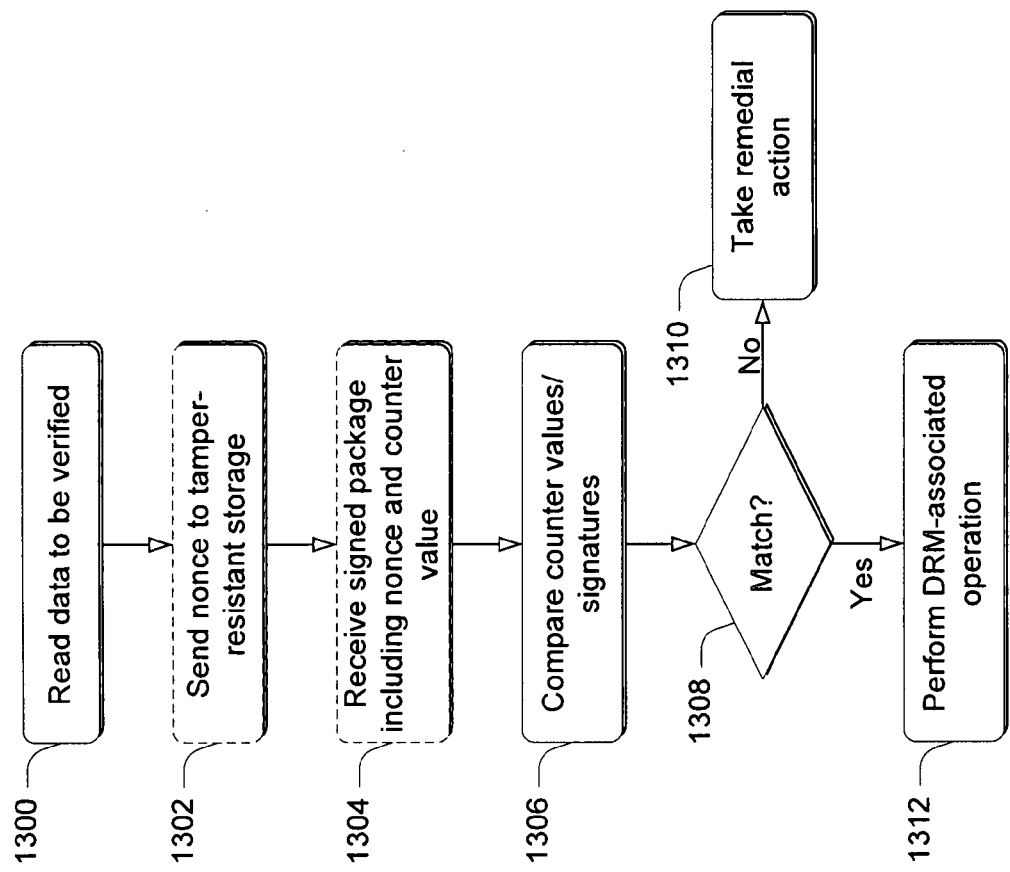
FIG. 13 is a flow diagram that describes steps in a method in accordance with one or more embodiments.

FIG. 13 is a flow diagram that describes steps in a method in accordance with one or more embodiments. The method can be implemented in connection with any suitable hardware, software, firmware or combination thereof. In at least some embodiments, the method can be implemented by a system, such as the one described above. In particular, in this example, the method can be implemented by DRM software, such as DRM partition 206 (FIG. 2). It is to be appreciated and understood that other systems can be utilized without departing from the spirit and scope of the claimed subject matter.

Step 1300 reads data that is to be verified. This step can be implemented in any suitable way. For example, in some embodiments, the step can be implemented by reading in all data that has been DRM-protected, as in Example 1 above. Recall that, in the Example 1 case, this includes all of the DRM data was stored in the local storage and signed with a signing key. Alternately or additionally, individual data portions can be read, as in Examples 2 and 3, along with the associated signed table. In those cases, individual data portions have respective signatures that can be used in the verification process.

Step 1302 sends, in the case of Example 1, a nonce to tamper-resistant storage and steps 1304 receives a signed package that includes the nonce and a counter value.

Step 1306 compares counter values/signatures. This step can be performed in any suitable way. For example, in some embodiments, a counter value stored with the data in the local storage can be compared with a counter value received in a signed package received from the tamper-resistant storage, as in Example 1. Alternately or additionally, this step can be performed by comparing a master counter value contained in an associated table with a counter value stored with the data in local storage. In addition, signatures can be computed as described above and compared with signatures associated with individual data portions that are read, as in Examples 2 and 3. If, at step 1308, the compared values do not match, then step 1310 takes a remedial action which might be to disallow a desired DRM operation. If, however, the compared values match, then step 1312 performs a DRM-associated operation.

Now consider the instance in which the tamper-resistant storage performs counter value verification. In this instance, DRM software, such as the DRM partition described above, provides new data to be written along with a counter value into the tamper-resistant storage 214. This data and counter value can be provided via a secure connection. For example, the DRM partition can provide the data along with a table, such as the tables described above, to the tamper-resistant storage 214. The tamper-resistant storage can then check the counter value associated with the table with the counter value associated with its own counter. If the counter values match, the table, including the counter value and associated subcounter (or hash) value can be incremented (or updated), signed and returned to the DRM partition.

Figure 14:
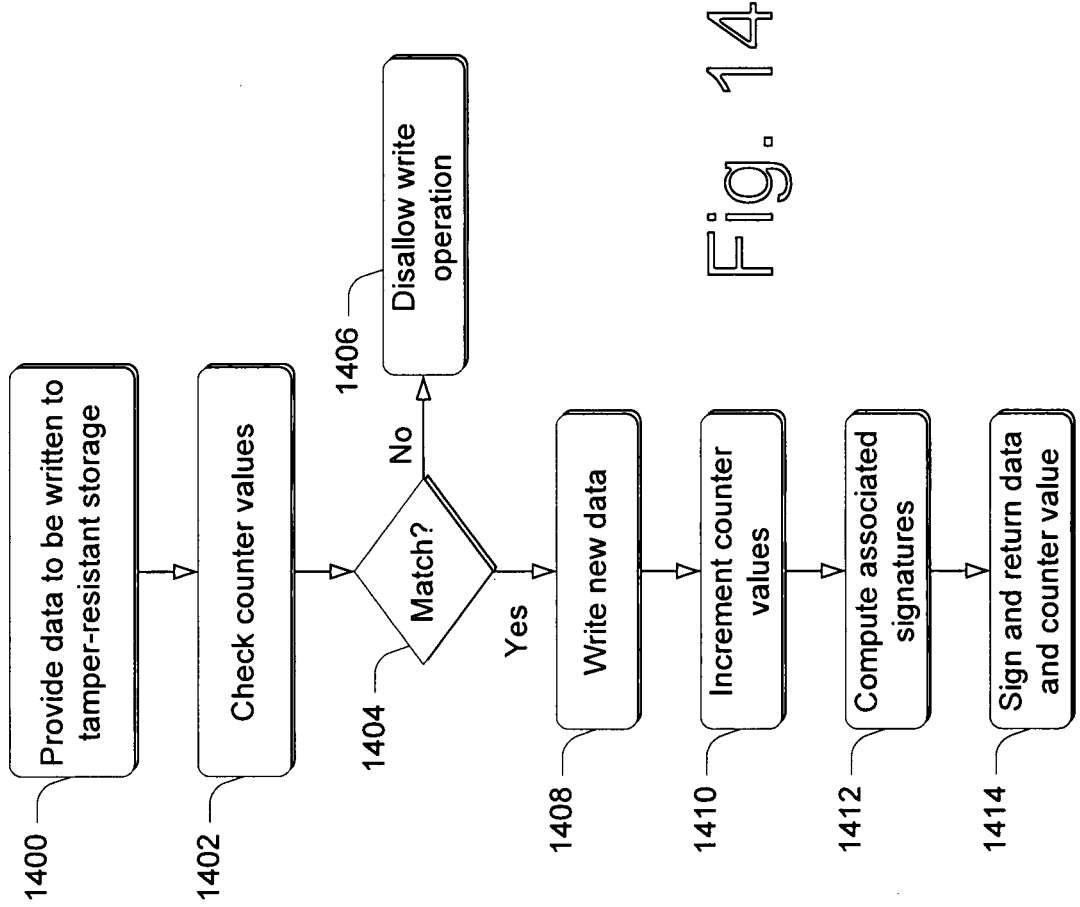
FIG. 14 is a flow diagram that describes steps in a method in accordance with one or more embodiments.

FIG. 14 is a flow diagram that describes steps in a method in accordance with one or more embodiments. The method can be implemented in connection with any suitable hardware, software, firmware or combination thereof. In at least some embodiments, the method can be implemented by a system, such as the one described above. In particular, in this example, the method can be implemented by secure, tamper-resistant storage, such as storage 214 (FIG. 2). It is to be appreciated and understood that other systems can be utilized without departing from the spirit and scope of the claimed subject matter.

Step 1400 provides data to be written to tamper-resistant storage. Examples of how this can be done are provided above. Step 1402 checks counter values. Examples of how this can be done are provided above. If, at 1404, the counter values do not match, then step 1406 disallows a write operation. If, on the other hand, the counter values match, step 1408 writes new data, step 1410 increments counter values, and step 1412 computes any associated signatures. Step 1414 signs and returns the data and the new counter value to the DRM software. The DRM software can then locally store the signed data and counter values for future use.

Example System

Figure 15:
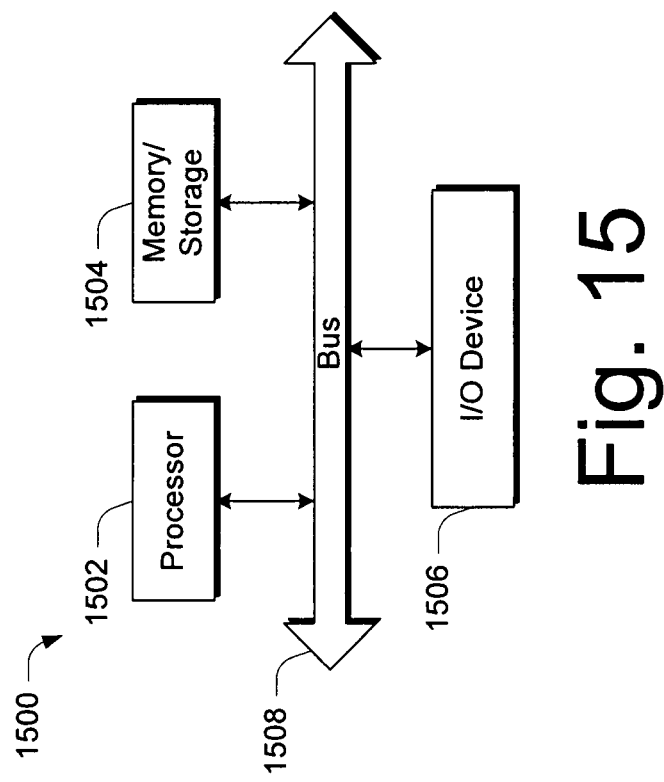
FIG. 15 illustrates an example system that can be used to implement a computing device, such as the FIG. 1 computing device.

FIG. 15 illustrates an example computing device 1500 that can implement the various embodiments described above. Computing device 1500 can be, for example, computing device 102 of FIG. 1 or any other suitable computing device.

Computing device 1500 includes one or more processors or processing units 1502, one or more memory and/or storage components 1504, one or more input/output (I/O) devices 1506, and a bus 1508 that allows the various components and devices to communicate with one another. Bus 1508 represents one or more of any of several types of bus structures, including a memory bus or memory controller, a peripheral bus, an accelerated graphics port, and a processor or local bus using any of a variety of bus architectures. Bus 1508 can include wired and/or wireless buses.

Memory/storage component 1504 represents one or more computer storage media. Component 1504 can include volatile media (such as random access memory (RAM)) and/or nonvolatile media (such as read only memory (ROM), Flash memory, optical disks, magnetic disks, and so forth). Component 1504 can include fixed media (e.g., RAM, ROM, a fixed hard drive, etc.) as well as removable media (e.g., a Flash memory drive, a removable hard drive, an optical disk, and so forth).

One or more input/output devices 1506 allow a user to enter commands and information to computing device 1500, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

CONCLUSION

Various embodiments utilize hardware-enforced boundaries to provide various aspects of digital rights management or DRM in an open computing environment. Against the backdrop of these hardware-enforced boundaries, DRM provisioning techniques are employed to provision such things as keys and DRM software code in a secure and robust way. Further, at least some embodiments utilize secure time provisioning techniques to provision time to the computing environment, as well as techniques that provide for tamper-resistant storage.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
generating a request for a secure time value, wherein said request is generated by a first time source located on a computing device that has been remotely provisioned with digital rights management (DRM) software, wherein at least some of the remotely provisioned DRM software is configured to be executable to acquire licenses associated with DRM-protected content;
sending the request, via the Internet, to a remote secure time service;
receiving, from the remote secure time service, at least one secure time value, wherein the act of receiving at least one secure time value is performed by receiving an authenticable package that includes a date/time value, wherein the authenticable package includes a nonce that was previously sent in the request;
storing said at least one secure time value in the first time source;
using the stored secure time value to provide a measure of time that can be used to make DRM-based decisions with regard to DRM-protected content, wherein the DRM-based decisions are made, at least in part, by a policy enforcement module executing inside a DRM partition, wherein the DRM partition is a software virtual machine that is configured to be isolated from other functional partitions, and wherein the policy enforcement module executing inside the DRM partition has been remotely provisioned to the DRM partition; and
enabling at least one time source that is different from the first time source to be used as a measure of time that can be used to make DRM-based decisions with regard to DRM-protected content, for a determined period of time in response to a failure event associated with the first time source.

2. The method of claim 1, wherein the authenticable package can be authenticated using a message authentication code.

3. The method of claim 1, wherein the authenticable package can be authenticated using a digital signature.

4. The method of claim 1, wherein said acts of generating, sending, receiving and storing are performed by an open computing system.

5. One or more hardware computer-readable storage memories storing computer readable instructions which, when executed by a computing device, implement a method comprising:

generating a request for a secure time value, wherein said request is generated by a first time source located on a computing device that has been remotely provisioned with digital rights management (DRM) software, wherein at least some of the remotely provisioned DRM software is configured to be executable to acquire licenses associated with DRM-protected content;

sending the request, via the Internet, to a remote secure time service;

receiving, from the remote secure time service, at least one secure time value, wherein the act of receiving at least one secure time value is performed by receiving an authenticable package that includes a date/time value, wherein the authenticable package includes a nonce that was previously sent in the request;

storing said at least one secure time value in the first time source;

using the stored secure time value to provide a measure of time that can be used to make DRM-based decisions with regard to DRM-protected content, wherein the DRM-based decisions are made, at least in part, by a policy enforcement module executing inside a DRM partition, wherein the DRM partition is a software virtual machine that is configured to be isolated from other functional partitions, and wherein the policy enforcement module executing inside the DRM partition has been remotely provisioned to the DRM partition; and enabling at least one time source that is different from the first time source to be used as a measure of time that can be used to make DRM-based decisions with regard to DRM-protected content, for a determined period of time in response to a failure event associated with the first time source.

6. The one or more hardware computer-readable storage memories of claim 5, wherein the authenticable package can be authenticated using a message authentication code.

7. The one or more hardware computer-readable storage memories of claim 5, wherein the authenticable package can be authenticated using a digital signature.

8. The one or more hardware computer-readable storage memories of claim 5, wherein said acts of generating, sending, receiving and storing are performed by an open computing system.

9. A computing device comprising:

one or more hardware processors;

one or more computer-readable storage memories storing computer readable instructions which, when executed by the one or more processors, implement a method comprising:

generating a request for a secure time value, wherein said request is generated by a first time source located on a computing device that has been remotely provisioned with digital rights management (DRM) software, wherein at least some of the remotely provisioned DRM software is configured to be executable to acquire licenses associated with DRM-protected content;

sending the request, via the Internet, to a remote secure time service;

receiving, from the remote secure time service, at least one secure time value, wherein the act of receiving at least one secure time value is performed by receiving an authenticable package that includes a date/time value, wherein the authenticable package includes a nonce that was previously sent in the request;

storing said at least one secure time value in the first time source;

using the stored secure time value to provide a measure of time that can be used to make DRM-based decisions with regard to DRM-protected content, wherein the DRM-based decisions are made, at least in part, by a policy enforcement module executing inside a DRM partition, wherein the DRM partition is a software virtual machine that is configured to be isolated from other functional partitions, and wherein the policy enforcement module executing inside the DRM partition has been remotely provisioned to the DRM partition; and enabling at least one time source that is different from the first time source to be used as a measure of time that can be used to make DRM-based decisions with regard to DRM-protected content, for a determined period of time in response to a failure event associated with the first time source.

10. The computing device of claim 9, wherein the authenticable package can be authenticated using a message authentication code.

11. The computing device of claim 9, wherein the authenticable package can be authenticated using a digital signature.

12. The computing device of claim 9, wherein said acts of generating, sending, receiving and storing are performed by an open computing system.

\* \* \* \* \*